United States Patent [19]

Chun

[11] Patent Number: 5,403,030
[45] Date of Patent: Apr. 4, 1995

[54] REAR SUSPENSION FOR VEHICLE

[75] Inventor: Dongee Chun, Kyungsangnam-do, Rep. of Korea

[73] Assignee: Hyundai Motor Company, Seoul, Rep. of Korea

[21] Appl. No.: 84,590

[22] Filed: Jul. 1, 1993

[30] Foreign Application Priority Data

Jul. 27, 1992 [KR] Rep. of Korea .................... 92-13900

[51] Int. Cl.6 ............................................. B60G 11/14
[52] U.S. Cl. ..................................... 280/688; 280/726
[58] Field of Search ............... 280/716, 688, 717, 723, 280/726, 725; 267/279, 281, 141.2

[56] References Cited

U.S. PATENT DOCUMENTS 4,834,416 5/1989 Shimoe et al. ...................... 280/717

FOREIGN PATENT DOCUMENTS 0045409 2/1991 Japan .................................. 280/726

Primary Examiner—Kenneth R. Rice
Assistant Examiner—Paul N. Dickson
Attorney, Agent, or Firm—Birch, Stewart, Kolasch & Birch

[57] ABSTRACT

A rear suspension for a vehicle has a trailing arm connected by a rubber bushing to a supporting shaft arranged at a right angle to a vehicle. The hub carrier is integrally connected to a rear portion of the trailing arm and is rotatably connected to a wheel. A shock absorber and a spring are respectively formed on an upper portion of the hub carrier and are connected to the vehicle on their upper end. A shaft extends outwardly from the supporting shaft with respect to the vehicle. The shaft is inserted into a rotating bushing. An extension arm is connected to the rotating bushing and extends backward with respect to the vehicle. A mount bushing is formed on a rear end of the extension arm and is mounted on the vehicle by a coupling bolt. A left and right portion and a front and rear portion respectively of the mount bushing have different spring characteristics from each other when viewed in plan.

10 Claims, 3 Drawing Sheets

REAR SUSPENSION FOR VEHICLE

BACKGROUND OF THE INVENTION

1. Field of the Invention

The present invention relates to a rear suspension for a vehicle and, more particularly, to a rear suspension having a trailing arm which can cope with a transverse force by controlling a toe when the vehicle is cornering and which can absorb vibration and noise without twisting a bushing. Ride comfort and handling safety are thereby improved.

2. Description of the Background Art

A suspension for a vehicle connects an axle shaft and a car body to each other, and controls a position of a tire with respect to the car body for ideal positioning during vehicle operation. The axle shaft is thereby prevented from directly transmitting impact or vibration from a road surface to the car body. Optimal handling safety, a reduction in damage to baggage and improved ride comfort are obtained.

A rear suspension having a trailing arm is illustrated in FIG. 5, in which the trailing arm 52 is connected to both sides of supporting shaft 51 transversely mounted on the car body by a rubber bushing. A hub carrier 54 rotatably supporting a wheel 53 is integrally formed with a rear portion of the trailing arm. Further, a shock absorber and a spring 55 are formed on an upper portion of the hub carrier 54 and connected on their upper ends with the car body.

According to the above-described suspension, in the case that impact or vibration from the road surface is applied to the wheel 53, the trailing arm goes up and down based on its connecting portion with the supporting shaft 51. At the same time, the vibration and impact are absorbed by the rubber bushing inserted in connecting portion of the supporting shaft and trailing arm, the shock absorber and the spring.

As shown in FIG. 5, the supporting shaft 51 is coupled to the car body by means of a bracket 58 having a cylindrical rubber bushing 57 mounted on a shaft 56. The shaft 56 protrudes to the outer side of the connecting portion of the trailing arm 52. Accordingly, when the transverse force F is applied to the wheel 53 when the vehicle is cornering, the wheel 53 is changed into a toe-out state thereby adversely affecting cornering safety. In other words, since the supporting shaft 51 and the trailing arm 52 are integrally formed with each other, when the transverse force F is applied to wheel 53, the wheel 53 is pushed in the direction indicated by the arrow and, at the same time, the supporting shaft 51 overcomes the elastic force of the rubber bushing 57 and is deformed as shown in broken lines in FIG. 5. The wheel is thereby changed to a toe-out out state with respect to the cornering direction. As a result, since the trailing arm's length is relatively long, a large moment (transverse force F × trailing arm's length 1) is obtained, such that the variation to the toe-out state is greatly increased.

As described above, when the wheel attains a toe-out state during cornering, the characteristics of the rear wheel are naturally bad and cornering is adversely affected.

SUMMARY OF THE INVENTION

Therefore, the present invention has been made in an effort to solve the above-described problems.

The primary object of the present invention is to provide a rear suspension which can cope with transverse force when the vehicle is cornering thereby controlling a toe-control.

Another object of the present invention is to provide a rear suspension which can absorb vibration and noise without twisting of a bushing thereby improving ride comfort and handling safety.

To achieve the above objects, the present invention provides a rear suspension for a vehicle comprising: a trailing arm connected to the supporting shaft arranged at a right angle to a car body by a rubber bushing; a hub carrier integrally connected to a rear portion of the trailing arm and rotatably connecting a wheel thereon; a shock absorber and a spring respectively formed on an upper portion of the hub carrier and connected to the car body on their upper end; a shaft projected from the supporting shaft outward with respect to the car body and inserted into a rotating bushing; an extension arm connected to the rotating bushing and extended backward with respect to the car body; and a mount bushing formed on a rear end of the extension arm and mounted on the car body by a coupling bolt. A left and right portion and a front and rear portion respectively of the mount bushing have different spring characteristics from each other when viewed in plan.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein: given by way of illustration only, and thus are not limitative of the present invention, and wherein.

DETAILED DESCRIPTION OF THE PREFERRED EMBODIMENTS

Figure 1:
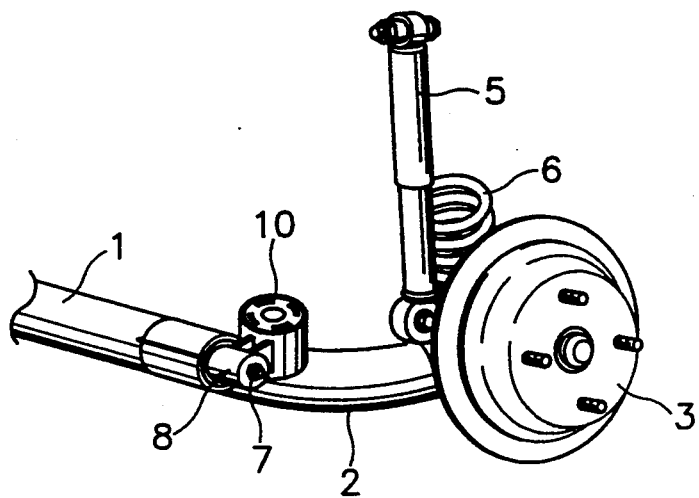
FIG. 1 is a perspective view of a rear suspension in accordance with an embodiment of the present invention.

A rear suspension for a vehicle according to the present invention is illustrated in a perspective view in FIG. 1. A trailing arm 2 is movable upwardly and downwardly and is connected to both ends of a supporting shaft 1 by means of a rotating rubber bushing 8. The supporting shaft 1 is positioned transverse to a longitudinal axis of a car body 11. A hub carrier 4 rotatably connects the wheel 3 to trailing arm 2. The hub carrier 4 is integrally formed on a rear portion of the trailing arm 2.

Further, a shock absorber 5 and a spring 6 are mounted on an upper portion of the hub carrier 4 and their upper ends are connected to the car body.

Figure 2:
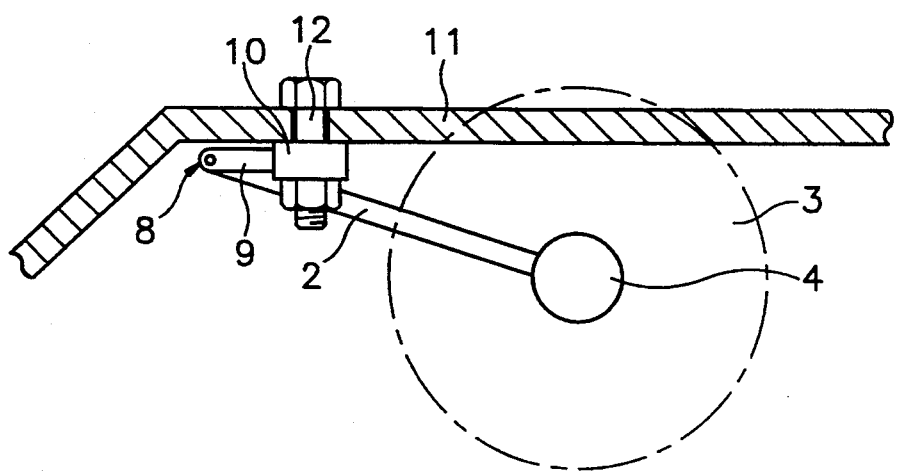
FIG. 2 is a side view of a rear suspension in accordance with an embodiment of the present invention.
Figure 3:
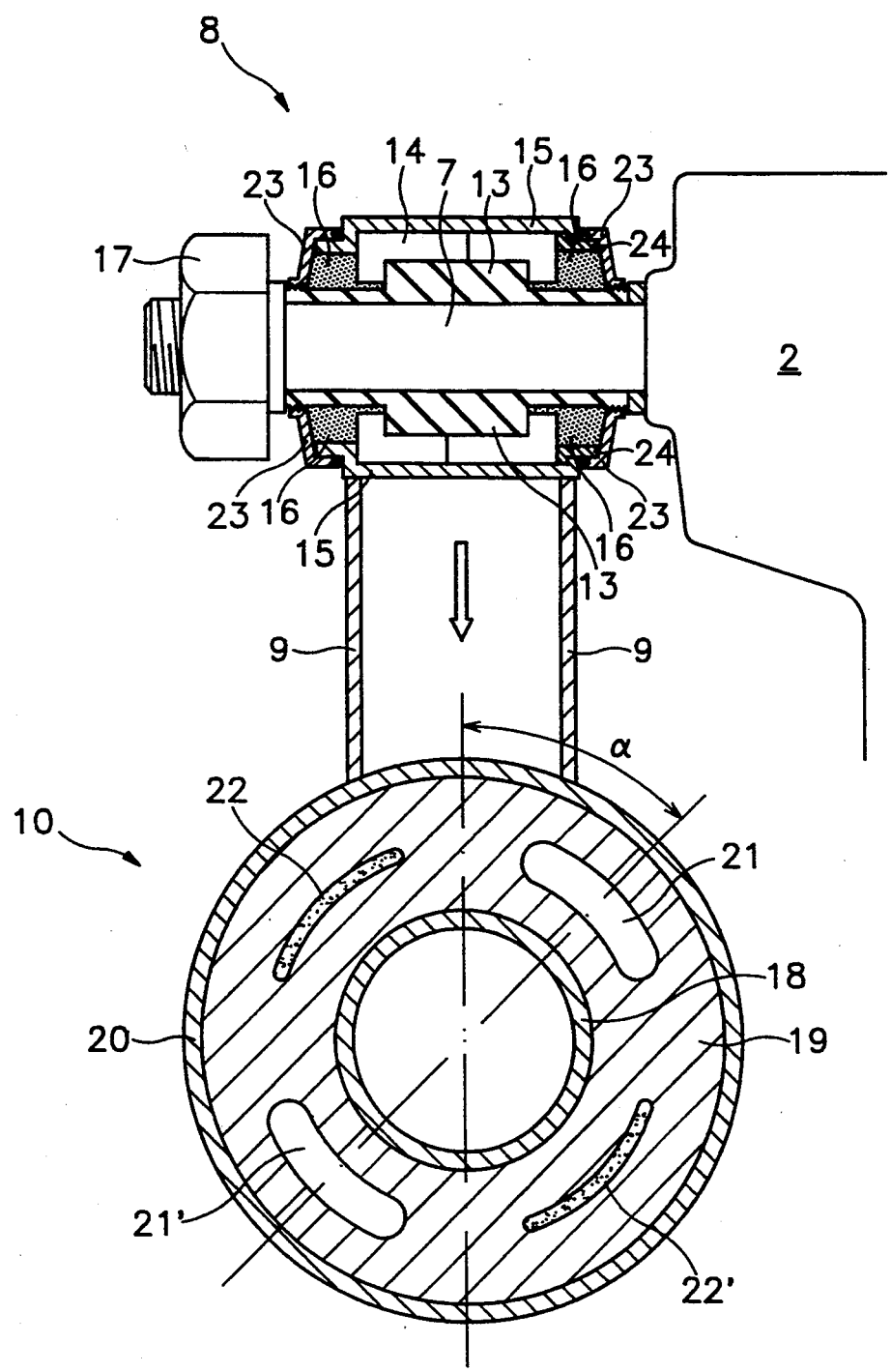
FIG. 3 is a partial plan sectional view of a rear suspension in accordance with an embodiment of the present invention.

The rear suspension is connected to the car body by means of a vertical-type mount bushing 10, using a coupling bolt 12 which penetrates the car body 11 to mount the bushing 10 as shown in FIG. 2. The mount bushing 10 is formed on a rear portion of an extension arm 9 which is connected to the rotating bushing 8. A shaft 7 is inserted in bushing 8 as seen in FIG. 3. This shaft 7 protrudes from a front end of the trailing arm 2.

As shown in FIG. 3, the rotating bushing 8 includes an inner tube 13 at its center portion, a plastic bearing 14 located on a circumference of the inner tube 13 and an outer tube 15 located on a circumference of the plastic bearing 14 and connected to the extension arm 9 on its rear portion. A cover pipe 24 coupled to outer pipe 15 is also provided. Grease 16 is filled between the inner tube 13 and the outer tube 15 and a dust cover 23 is provided for protecting the grease 16. The shaft 7 is inserted into the inner tube 13 and coupled with the rotating bushing 8 by a coupling nut 17.

Further, the mount bushing 10 is vertically positioned with respect to the car body and has a cylindrical configuration. The mount bushing 10 includes an inner tube 18 at its center portion, an outer tube 20 connected to the extension arm 9 on its front portion, and elastic rubber 19 inserted between the inner tube 18 and the outer tube 20. On the elastic rubber 19, two arc-shaped holes 21, 21' are symmetrically formed on the same line and two steel plates 22, 22' are symmetrically formed orthogonally to the line on which the arc-shaped holes 21, 21' are located. The steel plates 22, 22' are buried in the elastic rubber 19.

Accordingly, the direction where the holes 21, 21' are formed affects flexible spring characteristics of the bushing, and the direction where the steel plates 22, 22' are buried has hard spring characteristics. In addition, the direction where the holes 21, 21' are formed is at an angle of α degree with respect to the car body's longitudinal direction. The angle α is preferably not more than 45 degrees to improve the ride comfort and the handling safety of the vehicle.

Figure 4:
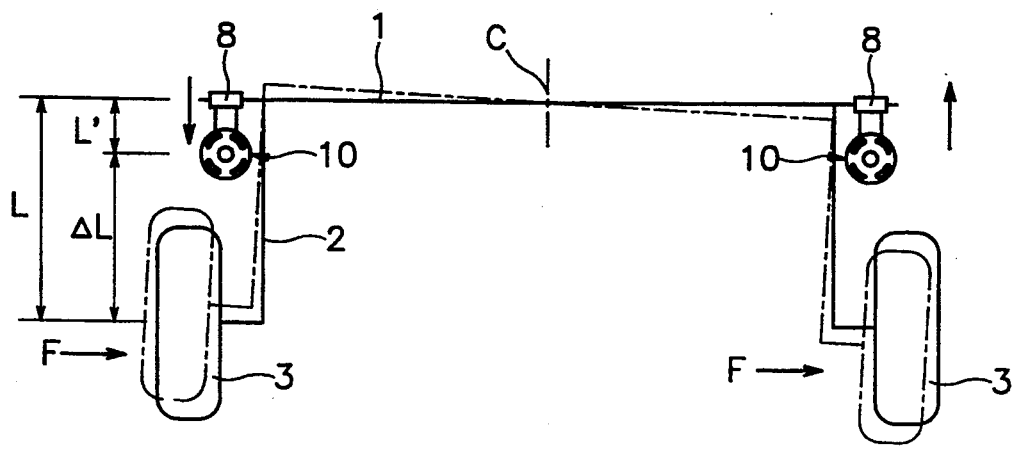
FIG. 4 is a plan view showing an operating state of a rear suspension in accordance with an embodiment of the present invention.
Figure 5:
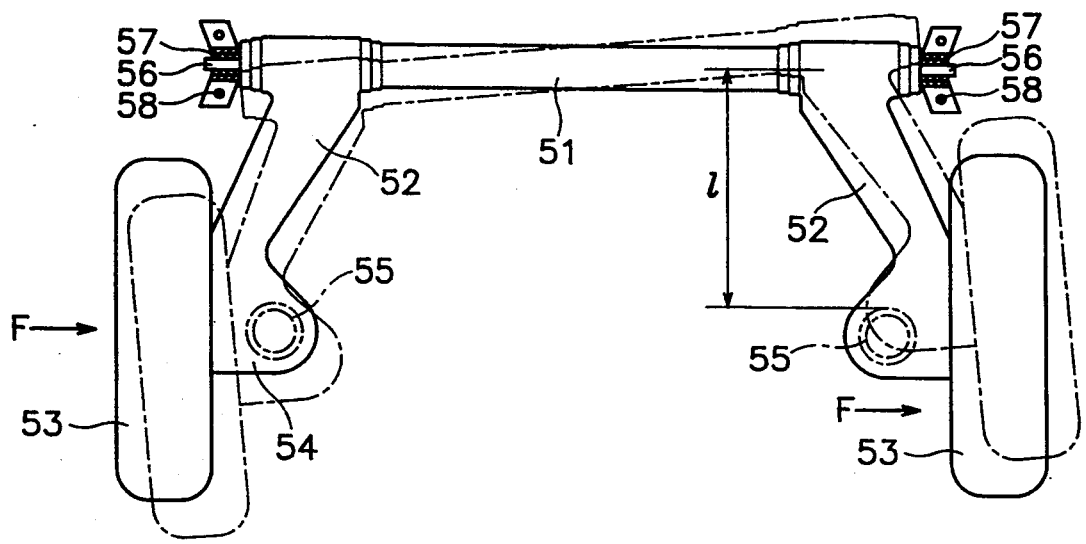
FIG. 5 is a plan view showing an operating state of a rear suspension in accordance with the conventional art.

In the mount bushing 10 as described above, a central line between the holes 21, 21' and the steel plates 22, 22' is parallel with the car body's longitudinal axis. The hole 21 close to the car body is formed at the front portion of the mount bushing 10. Although FIG. 3 illustrates the suspension of the left rear wheel only, as shown in FIG. 4, the suspension is symmetrically at both rear wheels.

According to the above-described suspension, when the vehicle is cornering and the transverse force F is applied to the wheel 3, the supporting shaft 1 integrally formed with the trailing arm 2 receives a force which tends to turn the supporting shaft 1 in the counterclockwise direction.

Accordingly, as shown in FIG. 3, the shaft 7 on the outer end of the trailing arm 2 pushes the extension arm 9 backward as indicated by an arrow, and the pushing force is transmitted to the front portion of the mount bushing 10.

When the transverse force F is transmitted to the mount bushing 10 as described above, the force is transmitted to the hole 21 and the steel plate 22 in the process of absorbing the force in the mount bushing 10.

In the above case, since the portion where the hole 21 is formed has more flexible spring characteristics than the portion where the steel plate 22 is buried, the portion having the hole 21 gets pressed and, at the same time, the front end of the extension arm 9 turns in a clockwise direction in the drawing whereby, as shown in FIG. 4, the supporting shaft 1 turns in the forward direction clockwise, such that, the wheel 3 is changed into being in the toe-in state as shown in broken line.

When the wheel 3 is changed into being in the toe-in state with respect to the cornering direction, the cornering safety and the tracing characteristics are increased.

Further, in the present invention, since the extension arm 9 mounted to the car body by the mount bushing 10 is located behind the front end of the trailing arm 2, the operating length of the trailing arm 2 becomes ΔL, subtracting the length L' of the extension arm 9 from the real length L of the trailing arm 2 (see FIG. 4). Therefore, as the moment with respect to the transverse force F becomes "F(transverse force)×ΔL(operating length of the trailing arm)". The moment is decreased as compared with that of conventional suspension, thereby reducing the variation of the toe.

The vibration and noise from the wheel are also absorbed by the mount bushing 10, since the mount bushing 10 serves as an absorber by being compressed during its operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear suspension for a vehicle, the vehicle having a front side, a rear side, a left side, a right side and a longitudinal axis, the rear suspension comprising:

a supporting shaft extending transversely with respect to the longitudinal axis of the vehicle;

a trailing arm connected to the supporting shaft;

a hub carrier integrally connected to a rear portion of said trailing arm, the hub carrier having a wheel rotatably mounted thereon;

a shaft projecting from the trailing arm; a rotating bushing receiving and coupled to the shaft projecting from the trailing arm;

an extension arm connected to the rotating bushing, the extension arm extending rearwardly with respect to the vehicle;

a mount bushing being mounted on a rear end of the extension arm, the mount bushing being generally perpendicular to the extension arm, the mount bushing having a left portion, a right portion, a front portion and a rear portion with respect to the longitudinal axis of the vehicle, the mount bushing having different spring characteristics in the left and right portions and having different spring characteristics in the front and rear portions thereof; and a coupling bolt mounting the mount bushing to the vehicle.

2. The rear suspension as set forth in claim 1, wherein the rotating bushing comprises:

an inner tube, the shaft projecting from the trailing arm being inserted into the inner tube;

a plastic bearing located on a circumference of the inner tube;

an outer tube located on a circumference of the plastic bearing, the outer tube being connected to the extension arm on a rear portion thereof;

grease filled between the inner tube and the outer tube; and a dust cover adjacent the outer tube, the dust cover protecting the grease.

3. The rear suspension as set forth in claim 1, wherein the mount bushing has a generally cylindrical configuration and includes:

an inner tube centrally located in the mount bushing;

an outer tube connected to the extension arm on a front portion thereof, the outer tube surrounding the inner tube;

an elastic rubber between the inner tube and the outer tube;

a plurality of holes symmetrically formed in the elastic rubber, the plurality of holes being symmetrically formed in pairs with each pair being on a line positioned at a predetermined angle with respect to the longitudinal axis of the vehicle; and a plurality of steel plates embedded in the elastic rubber, the steel plates being provided in pairs and being symmetrically positioned on lines which are formed at right angles with respect to the lines on which the plurality of holes are provided.

4. The rear suspension as set forth in claim 3, wherein two holes and two steel plates are provided in the mount bushing, the two holes each having an arc-shape.

5. The rear suspension as set forth in claim 4, wherein a generally horizontal extension arm axis is provided along the extension arm which generally intersects a center of the mount bushing, the two holes being positioned a predetermined angle from the extension arm axis and the line on which the two steel plates are positioned being generally at a right angle to the line passing through the two holes.

6. The rear suspension as set forth in claim 5, wherein the predetermined angle between the extension arm axis and the two holes is less than or equal to 45 degrees.

7. The rear suspension as set forth in claim 6, wherein the extension arm axis and the longitudinal axis of the vehicle are generally parallel.

8. The rear suspension as set forth in claim 1, further comprising:

a shock absorber mounted on an upper portion of said hub carrier and connected to the vehicle at an upper end thereof; and a spring mounted on an upper portion of said hub carrier and connected to the vehicle at an upper end thereof.

9. The rear suspension as set forth in claim 1, wherein said rotating bushing is a rubber rotating bushing.

10. The rear suspension as set forth in claim 1, further comprising a bolt for connecting the mount bushing to the shaft projecting from the trailing arm.

* * * * *